United States Patent
Büchler et al.

(10) Patent No.: US 10,543,550 B2
(45) Date of Patent: Jan. 28, 2020

(54) PRESSURE WELDING DEVICE AND PRESSURE WELDING METHOD

(71) Applicant: KUKA INDUSTRIES GMBH, Augsburg (DE)

(72) Inventors: Michael Büchler, Augsburg (DE); Otmar Fischer, Augsburg (DE); Harald Meyer, Augsburg (DE); Klaus Schneider, Friedberg (DE)

(73) Assignee: KUKA DEUTSCHLAND GMBH, Augsburg (DE)

( * ) Notice: Subject to any disclaimer, the term of this patent is extended or adjusted under 35 U.S.C. 154(b) by 153 days.

(21) Appl. No.: 15/526,145

(22) PCT Filed: Nov. 12, 2015

(86) PCT No.: PCT/EP2015/076438
§ 371 (c)(1),
(2) Date: May 11, 2017

(87) PCT Pub. No.: WO2016/075238
PCT Pub. Date: May 19, 2016

(65) Prior Publication Data
US 2017/0326667 A1 Nov. 16, 2017

(30) Foreign Application Priority Data

Nov. 12, 2014 (DE) .................... 20 2014 105 437 U (51) Int. Cl.
*B23K 20/12* (2006.01)
*B23K 20/00* (2006.01)
(Continued)

(52) U.S. Cl.
CPC .............. *B23K 9/08* (2013.01); *B23K 9/0737* (2013.01); *B23K 20/12* (2013.01); *B23K 20/121* (2013.01);
(Continued)

(58) Field of Classification Search
CPC .............................. B23K 20/129; B23K 20/00
See application file for complete search history.

(56) References Cited

U.S. PATENT DOCUMENTS 3,516,591 A * 6/1970 Gage ...................... B23K 20/12
228/2.3
3,575,334 A * 4/1971 Stamm ................. B23K 20/121
156/73.5
(Continued)

FOREIGN PATENT DOCUMENTS

CN 1907629 A 2/2007
DE 26 47 735 A1 5/1977
(Continued)

*Primary Examiner* — Seth W. MacKay-Smith
(74) *Attorney, Agent, or Firm* — McGlew and Tuttle, P.C.

(57) ABSTRACT

A pressure welding method and a pressure welding device (1) are provided. The pressure welding device (1) includes a plastification device (7), an upsetting device (8) and component mountings (34,35,36,37) for the components (2,3,3',4) to be welded together and a machine frame (12). The pressure welding device (1) further includes a plurality of machine heads (13,14), each having a component mount (34,35), which machine heads are movably arranged on the machine frame and are connected to respective upsetting drives (22). The machine heads (13,14) and respective upsetting drives (22) can be independently driven. An upsetting head or support head (27), which is preferably secured on the frame, is arranged between the machine heads (13, 14).

17 Claims, 8 Drawing Sheets (51) Int. Cl.
*B23K 9/08* (2006.01)
*B23K 9/073* (2006.01)
*H05H 1/40* (2006.01)
*B23K 9/10* (2006.01)

(52) U.S. Cl.
CPC ............. *H05H 1/40* (2013.01); *B23K 9/0732* (2013.01); *B23K 9/1087* (2013.01)

(56) References Cited

U.S. PATENT DOCUMENTS

| | | | | | |
|---|---|---|---|---|---|
| 3,613,982 | A | * | 10/1971 | Hollenberg | B23K 20/121 228/2.3 |
| 3,680,760 | A | * | 8/1972 | Costa | B23K 20/121 156/73.5 |
| 3,717,295 | A | * | 2/1973 | Woodall | B23K 20/12 100/214 |
| 3,753,820 | A | * | 8/1973 | Ishikawa | B23K 20/12 156/580 |
| 3,838,807 | A | * | 10/1974 | Nomura | B23K 20/12 220/23.8 |
| 3,877,629 | A | * | 4/1975 | Louw | B23K 20/12 228/2.3 |
| 3,897,896 | A | * | 8/1975 | Louw | B23K 20/12 228/112.1 |
| 4,043,497 | A | * | 8/1977 | Jones | B23K 20/12 228/13 |
| 4,414,046 | A | * | 11/1983 | Palmer | B23K 20/12 156/580 |
| 4,552,609 | A | * | 11/1985 | Larsen | B23K 20/121 156/358 |
| 4,733,814 | A | * | 3/1988 | Penman | B23K 20/12 228/114.5 |
| 4,998,663 | A | * | 3/1991 | Cakmak | B23K 20/12 156/378 |
| 6,634,540 | B1 | * | 10/2003 | Afschrift | B23K 20/129 228/114.5 |
| 8,002,163 | B2 | * | 8/2011 | Kawaura | B23K 20/12 228/112.1 |
| 2007/0051776 | A1 | * | 3/2007 | Estes | B23K 20/129 228/101 |
| 2007/0101838 | A1 | * | 5/2007 | Semmlinger | B23K 20/12 82/142 |
| 2007/0181639 | A1 | * | 8/2007 | Rudolph | B23K 20/121 228/101 |
| 2009/0242613 | A1 | * | 10/2009 | Kawaura | B23K 13/015 228/114.5 |
| 2010/0206861 | A1 | | 8/2010 | Rudolph et al. | |
| 2014/0060956 | A1 | * | 3/2014 | Takai | B62D 5/0442 180/444 |
| 2015/0328676 | A1 | * | 11/2015 | Zinn | B21J 5/066 173/4 |
| 2016/0228978 | A1 | * | 8/2016 | Buchler | B23K 9/08 |

FOREIGN PATENT DOCUMENTS

| | | |
|---|---|---|
| DE | 20 2004 010386 U1 | 12/2005 |
| EP | 0 246 239 B1 | 11/1987 |
| GB | 1 097 233 A | 1/1968 |
| GB | 1518340 A | 7/1978 |
| IE | 38 15 957 C2 | 2/1990 |

* cited by examiner

PRESSURE WELDING DEVICE AND PRESSURE WELDING METHOD

CROSS REFERENCE TO RELATED APPLICATIONS

This application is a United States National Phase Application of International Application PCT/EP2015/076438, filed Nov. 12, 2015, and claims the benefit of priority under 35 U.S.C. § 119 of German Application 20 2014 105 437.5, filed Nov. 12, 2014, the entire contents of which are incorporated herein by reference.

FIELD OF THE INVENTION

The present invention pertains to a pressure welding device with a plasticization device and with an upsetting device as well as with component mounts for the components to be welded together and with a machine frame, wherein the pressure welding device has a plurality of machine heads, each with a component mount and which are each arranged movably on the machine frame and are connected to their own upsetting drive and to a pressure welding method.

BACKGROUND OF THE INVENTION

Such a pressure welding device is known from EP 0 246 239 A. It has a friction device for plasticization and an upsetting device as well as component mounts for the components to be welded together as well as a machine frame, on which two machine heads with a component mount each are mounted movably and are functionally connected to their own upsetting drives. The friction welding device is configured as a double-head machine, in which the machine heads and their upsetting drives are controlled jointly, wherein a stationary central component is arranged between the machine heads for the central third component. The upsetting drives are arranged on the outer side or rear side of the machine heads and act on pressure.

SUMMARY OF THE INVENTION

An object of the present invention is to show an improved pressure welding technique.

The pressure welding technique according to the invention, e.g., the pressure welding device and the pressure welding method, have various advantages. They make it possible, on the one hand, to increase the performance capacity and the quality of the process during pressure welding. On the other hand, the degree of automation and hence also the economy can be improved. Set-up and downtimes can be largely avoided or at least reduced. In addition, ergonomics is improved.

The pressure welding technique according to the invention is very versatile and offers a wide variety of use possibilities. These use possibilities may vary within a wide range with regard to the components and processes. A single operation or a parallel operation of pressure welding processes is possible, as desired. A parallel operation has an especially performance-increasing effect. It can be carried out with manual or automated loading and unloading.

The independent control of the machine heads and their upsetting drives offers a wide range of variants for various modes of operation of the pressure welding technique. An operation of the pressure welding device is possible, as desired, as a double single-head machine or as a double-head machine. In addition, a single-head operation is possible. In this case, a single pressure welding process for a single welded part or a plurality of separate pressure welding processes can, if necessary, be carried out parallel and in this case simultaneously or offset in time for forming two or more welded parts.

Further advantageous additions can be made by additional components for the pressure welding device.

The machining device according to the invention makes possible the finishing of the welded part in the mounted or clamped position at the pressure welding device. Machining is carried out, for example, on the weld joint or weld joints, and the ring-shaped weld bead present there is removed. This is efficient and saves time, additional effort and costs.

The weld joint is often located in the immediate vicinity of the machine head and of the component mount located there, which may lead to space problems. The adjusting device according to the invention makes possible a spacing between the machine head and the associated additional component mount, as a result of which sufficient space is created for the machining and for good accessibility to the machining point, especially to the weld joint.

The adjusting device according to the invention makes possible, in addition, a simple and rapid adaptation of the pressure welding device to different dimensions, especially component lengths. In addition, insertion or component tolerances as well as elastic shortening of the component that may possibly occur during the welding process can be compensated. This can take place automatically.

Optimization of the pressure welding process and optimal contacting of the components to be welded together and of the upsetting head are achieved with the adjusting device. This is also advantageous for the optimization of the process sequences, especially a programmed control of the plasticization and upsetting phases as well as of the feeds and component shortenings occurring in the process. Welded parts of very high quality can be produced as a result. This pertains, on the one hand, to the quality of the welded connection and, on the other hand, to the constant length of the welded parts.

Further, an actuating device for a clamping device on the component mount of the machine stock or headstock can be arranged in the drive train between the spindle drive and the spindle. The drive torque can now be transmitted via the drive housing of an actuating drive in an extensively deformation-free manner. Very high torques can thus also be transmitted with a clamping device actuation. On the other hand, a direct drive, in which the drive motor can be aligned with its motor axis essentially flush with the spindle axis, is possible hereby. Due to the separation of the actuating device from the drive motor, the latter may have any desired configuration. This makes possible the use of cost-effective standard motors. In addition, a direct drive is especially favorable for movable machine heads.

The direct drive eliminates the need for the intermediate gear with a belt drive, which gear has hitherto been common in many cases. The introduction of transverse forces onto the drive train can be avoided. The susceptibility to wear is markedly reduced.

In addition, additional components, e.g., a multiple disk brake and a rotary coupling for compensating alignment errors, may be accommodated in the drive train. In addition, a mass decoupling device may be implemented between the spindle drive and a machine head fed axially in the process.

It is further possible to combine the drive motor with a disk flywheel, which can be seated behind the drive motor when viewed from the machine head. The spindle drive may, in addition, be arranged on the machine frame, as desired, stationarily or floatingly or displaceably in the direction of the machine axis. A substantially wider bandwidth and freedom of configuration is obtained for the spindle drive due to the actuating device according to the invention. This makes it, in addition, possible to adapt to different requirements imposed on the machine, the operation or the process.

The pressure welding device may have various configurations. It may be configured, e.g., as a friction welding device. The components are preferably aligned here along the machine axis and plasticized on their front edges facing each other by friction and connected to one another by subsequent axial upsetting. As an alternative, pressure welding is possible with a circumferentially moved arc. The rotation of the arc can be controlled here by a drive device. Such a pressure welding device may likewise have a rotatable component mount at the machine head.

The present invention is schematically shown in the drawings as an example. The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
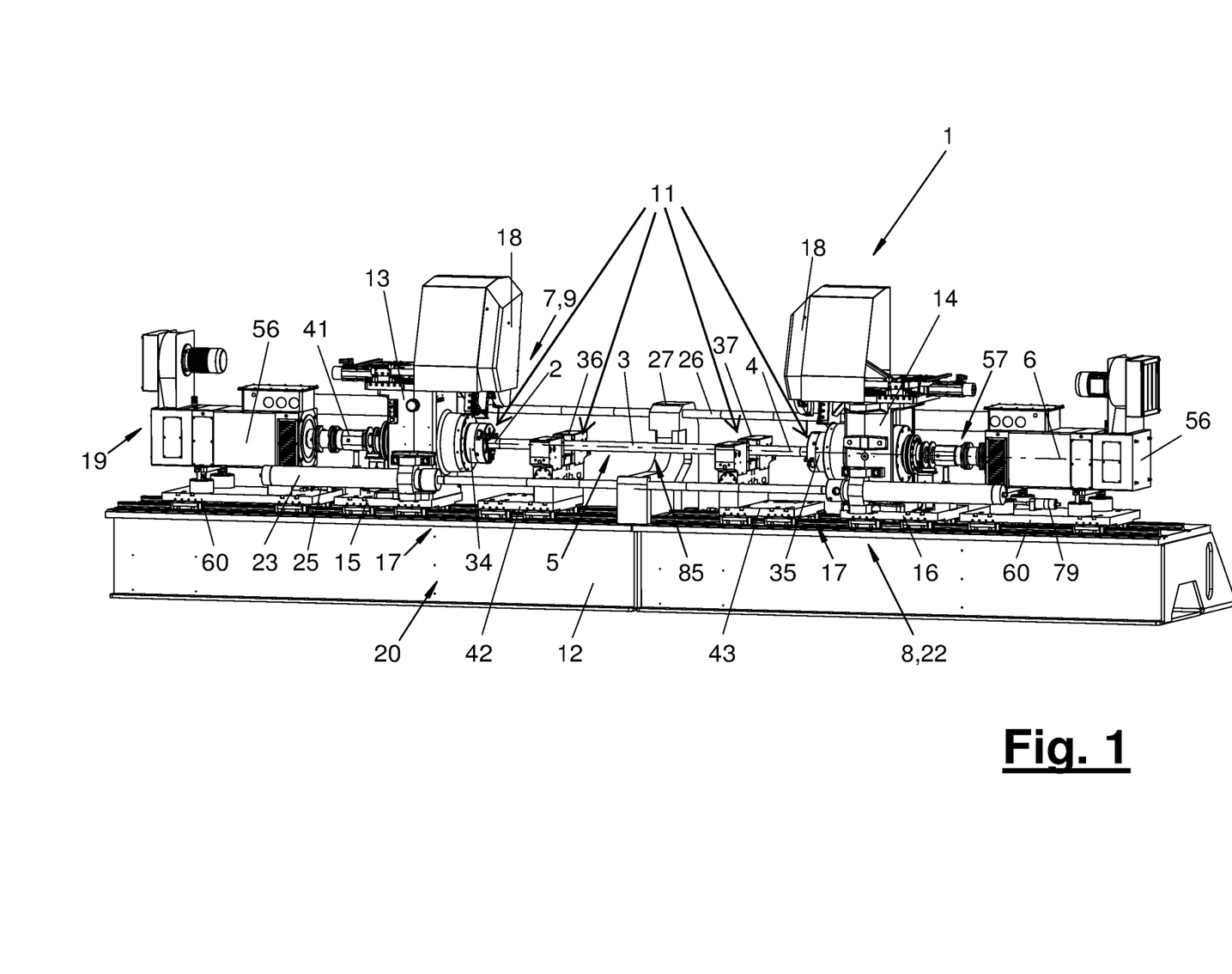
FIG. 1 is a perspective lateral view of a pressure welding device.

Referring to the drawings, FIG. 1 shows a pressure welding device (1) that is used to execute a pressure welding method.

Figure 6:
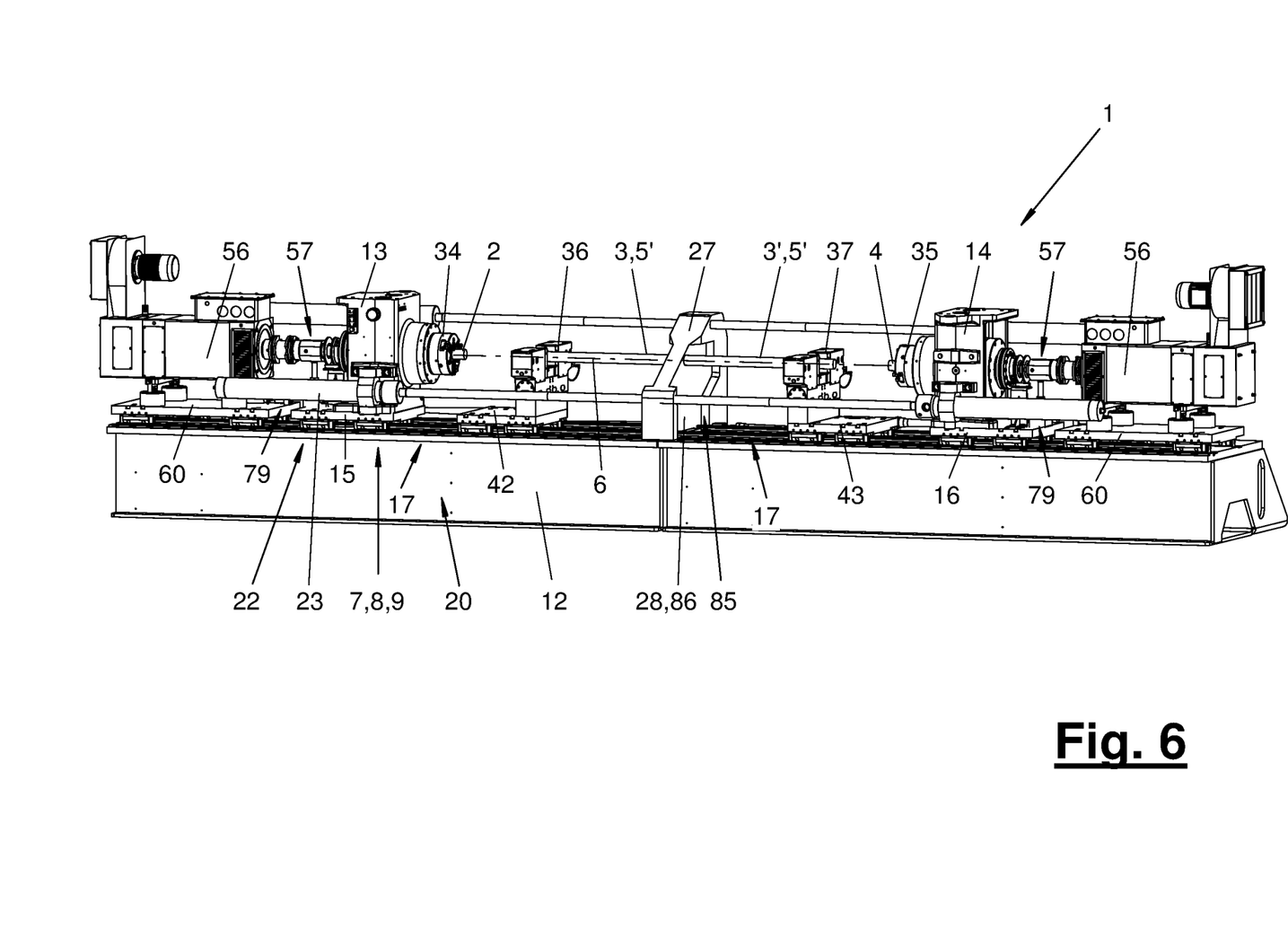
FIG. 6 is a perspective lateral view of a variant of the pressure welding device from FIGS. 1 through 5.

The pressure welding device (1) and the pressure welding method may have various configurations. FIG. 1 shows the pressure welding device with a plasticization device (7) and an upsetting device (8) common to the different variants. The components (2, 3, 3', 4) to be welded together are melted or softened on the sides or edges facing each other and are upset while forming a welded part (5, 5') shown in FIGS. 1, 4, 6 and 7. FIG. 6 shows that the upsetting device (8) has for this an upsetting drive (22), which moves the two or more components (2, 3, 3', 4) relative to one another.

The pressure welding device (1) further has a machine and process control (not shown), which is connected to the machine components described below and controls these. The machine and process control is, in addition, connected to the sensing, detection or measuring devices mentioned below and processes the signals thereof. It may have a memory-programmable configuration and contain one or more process or sequence programs, a technology data bank, memories for programs and recorded process data, a quality monitoring along with logging or the like.

The plasticization device (7) and the plasticization method may have various configurations. In the embodiments shown in FIGS. 1 and 7, the pressure welding device (1) is configured as a friction welding device, wherein the plasticization device (7) has a friction device (9).

In one variant, not shown, the plasticization device (7) may have an arc device, which heats and partially melts the edges of the components with an arc, the arc being moved along the circumference of the components with magnetic force by means of a drive device.

Figure 7:
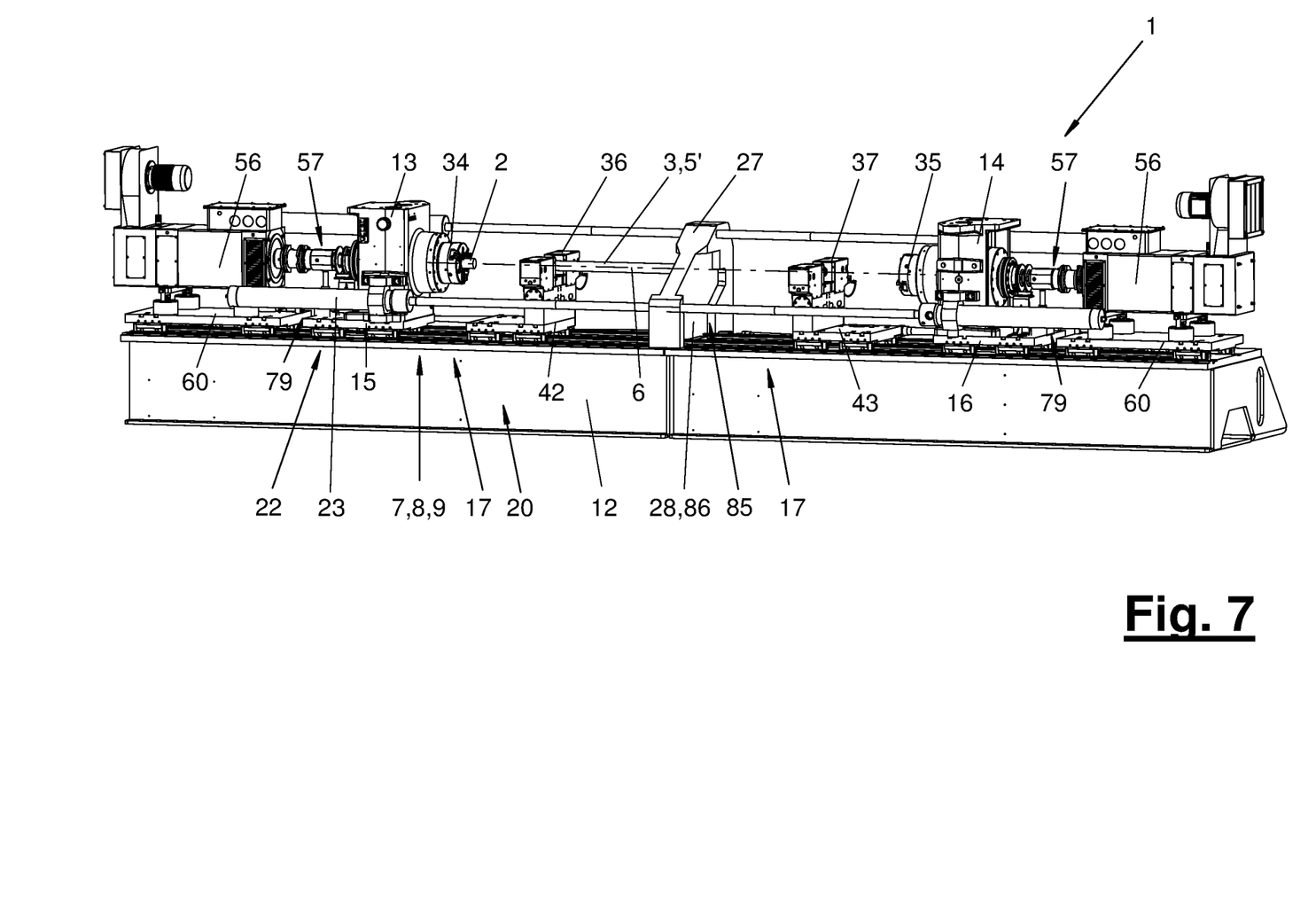
FIG. 7 is a perspective lateral view of a variant of the pressure welding device from FIGS. 1 through 5.
Figure 8:
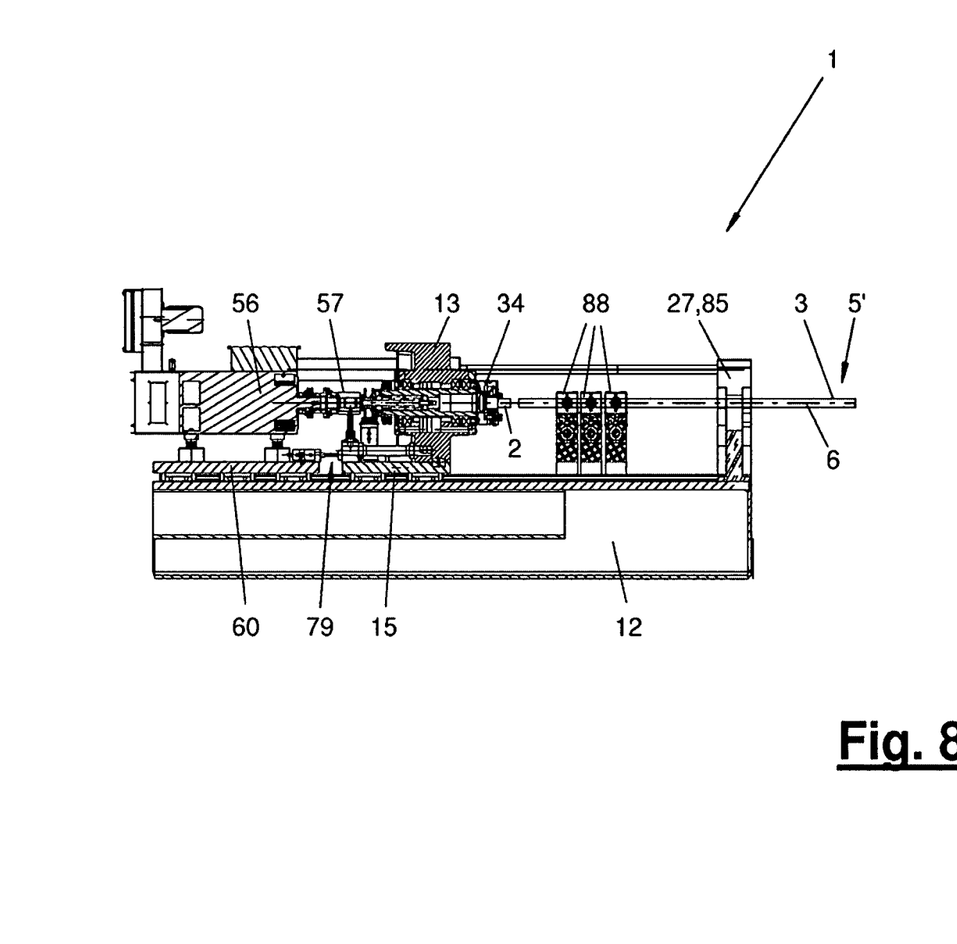
FIG. 8 is a sectional view another variant of the pressure welding device from FIGS. 1 through 5.

The pressure welding device (1) may be set up in different ways as shown in FIGS. 1-7. A different variant is shown in FIG. 8. As shown in FIG. 1, the pressure welding device (1) has a machine frame (12) with a longitudinal or machine axis (6). A mounting arrangement generally designated (11) comprises component mounts (34, 35), associated with two machine heads (13, 14), as well as additional component mounts (36, 37). As shown in FIG. 1, these component mounts (34, 35, 36, 37) cooperate to mount the components (2, 3, 3', 4) to be welded together. The machine frame (12) has a floor-mounted machine bed, on which the components of the pressure welding device (1), which will be explained below, are arranged. Further, an operating material supply unit (19) is present as shown in FIG. 1. The operating material supply unit (19) makes available the operating materials needed, especially electric current, hydraulic fluid, compressed air, lubricant and coolant or the like and routes these to the respective consumers.

The pressure welding device (1) has an enclosing protective housing with a closable access on the operating side (20) as shown in FIG. 1. On the operating side (20), a worker or a robot can feed the components (2, 3, 3', 4) to be joined and remove the finished welded part (5, 5').

As shown in each of FIGS. 1-8, the pressure welding of the components (2, 3, 3', 4) takes place in the direction of the machine axis (6), along which the components (2, 3, 3', 4) are also aligned. As a result of the pressure welding, the components (2, 3, 3', 4) are plasticized on the front sides or edges facing each other and upset along the machine axis (6). The machine axis (6) forms the process axis for the plasticizing and upsetting.

In case of friction welding, the components (2, 3, 3', 4) are pressed together axially by the upsetting drive (22) under a force that can be controlled or regulated, wherein the component (2, 4) held in the component mount (34) is rotated about the machine axis (6). The edges of the components are heated by the friction heat at the connection point, and they anneal and become pasty. The upsetting stroke is then carried out by the upsetting drive (22) with load increase. A component shortening and the formation of a friction bead at the connection point of the components (2, 3, 3', 4) take place in case of the friction and upsetting.

In case of welding with a magnetically moved arc, the components (2, 3, 3', 4) are brought into contact under application of an electric voltage and subsequently again spaced axially, wherein an arc is ignited between the components (2, 3, 3', 4), which arc heats and partially melts the edges of the components. The arc is now moved rotatingly along the circumference of the component with magnetic force by means of a drive device. Subsequently, the upsetting stroke for contacting and connection the components (2, 3, 3', 4) is in turn carried out by the upsetting drive (22).

The components (2, 3, 3', 4) may consist of various materials. They may be electrically conductive for welding with a magnetically moved arc. Metallic materials, especially steel, light metal alloys, cast alloys or the like are preferably used. The material pairings may be different. Especially iron-containing materials may be joined with nonferrous metals. In addition, non-metallic materials, e.g., ceramic materials, may be welded, especially in conjunction with another metallic component.

In each of the different variants of FIGS. 1-7 and FIG. 8, the pressure welding device (1) has a plurality of, especially two machine heads (13, 14), each with a possibly rotatable component mount (34, 35), which are arranged movably on the machine frame (12). In each of the variants of FIGS. 1 through 7, two machine heads (13, 14) are arranged on the machine frame (12) located opposite one another on the common machine axis (6).

In other variants, the number of machine heads may also be greater than two, e.g., in case of a parallel or multiple arrangement of machine head pairings. The machine heads (13, 14) preferably have a similar configuration, but, as an alternative, they may also be different.

The friction device (9) and the arc device, not shown, are each associated with the machine heads (13, 14). The friction device (9) and the corresponding configuration of machine heads will be explained in detail below. For the arc device, a power source and a drive device for the arc are associated with each of the machine heads (13, 14). The configuration of the machine heads (13, 14) described below may otherwise be used for both variants of the plasticization device (7).

The machine heads (13, 14) are each mounted movably, especially axially displaceably in relation to the machine frame (12), especially to the machine bed thereof. As can be seen in FIG. 1, the machine heads (13, 14) are arranged for this, e.g., on a carrier (15, 16), which is guided displaceably and supported on the machine bed by means of a guide (32) aligned along the machine axis (6). The machine head (13, 14) may have a detection device for path and/or position.

Each machine head (13, 14) is moved by the upsetting drive (22). In the exemplary embodiments shown in FIGS. 1 through 7, its own upsetting drive (22) is associated with each machine head (13, 14). This upsetting drive can always be supported at an upsetting head or support head (27) arranged centrally and stationarily on the machine frame (12). The upsetting drive (22) generates pulling forces in the preferred embodiment explained in detail below.

The machine head (13, 14) is always moved by the upsetting head (22). In the exemplary embodiments shown in FIGS. 1 and 7, an upsetting drive (22) of its own is associated with each machine head (13, 14). This drive may be supported on an upsetting head or support head (27) arranged centrally and stationarily on the machine frame (12). The upsetting drive (22) generates pulling forces in the preferred embodiment, which will be explained in more detail below.

FIGS. 1, 2, 4, 6, and 7 show the mounting of the components (2, 3, 3', 4) with the component mounts (34, 35) at the respective machine head (13, 14) and the additional component mounts (36, 37), which are each arranged movably between the respective machine head (13, 14) and the upsetting or support head (27). The additional or central component mount (36, 37) is preferably mounted displaceably along the machine axis (6). The respective component mount (36, 37) may have for this, e.g., a carrier (42, 43), especially a slide, which is likewise mounted displaceably along the guide (32). In the exemplary embodiments shown, two additional or central component mounts (36, 37) are present. Their number may also be higher than two. The additional component mounts (36, 37) may likewise have a detection device for path and/or position.

Figure 4:
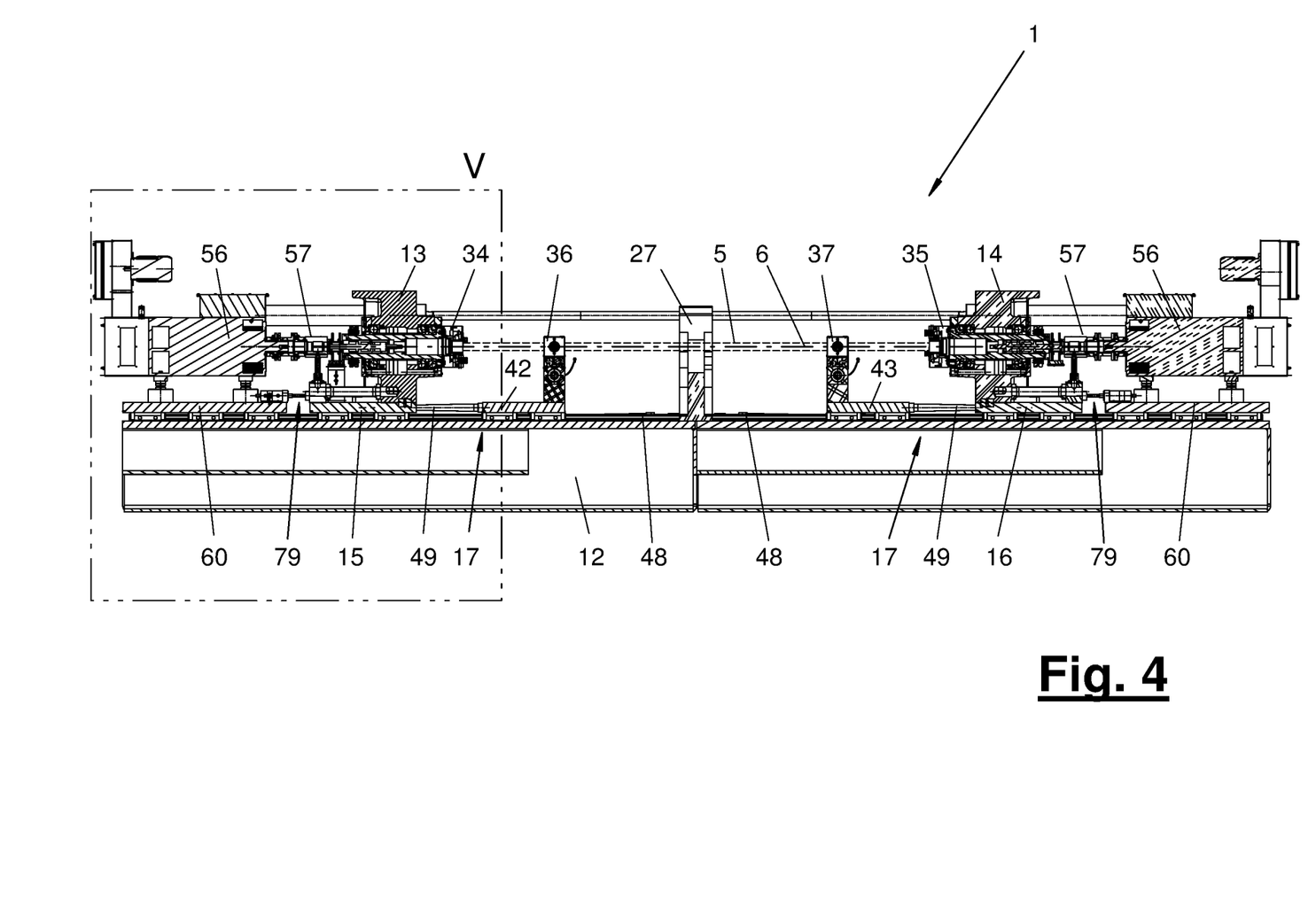
FIG. 4 is a longitudinal sectional view through the pressure welding device according to section line IV-IV of FIG. 3.

The machine heads (13, 14) with their friction device (9) or arc unit and their upsetting drives (22) can be controlled separately and independently of each other. This makes possible various modes of operation of the pressure welding device (1) in conjunction with a correspondingly adaptable central upsetting or support head (27). This may be operated as a double single-head machine or, as desired, also as a double-head machine. In case of operation as a double single-head machine as shown in FIG. 7, two or more separate pressure welding processes can be carried out simultaneously to form two or more welded parts (5') with the machine heads (13, 14) and their upsetting drives (22) acting independently of one another. In case of operation as a double-head machine as shown in FIGS. 1 and 4, the machine heads (13, 14) and their upsetting drives (22) work together for the joint formation of a welded part (5).

The separately displaceable machine heads (13, 14) can be moved together or independently of one another in the pairings shown. They carry out feed or travel motion directed towards one another during the pressure welding process. A common motion can take place simultaneously and in a coordinated manner.

Further, it is possible that both machine heads (13, 14) are moved simultaneously, but independently of one another. In addition, only one machine head (13, 14) may optionally be moved, wherein the other machine head (14, 13) is stationary. These different kinematics of the machine heads (13, 14) make it possible to carry out different pressure welding processes and a single or parallel operation.

Figure 3:
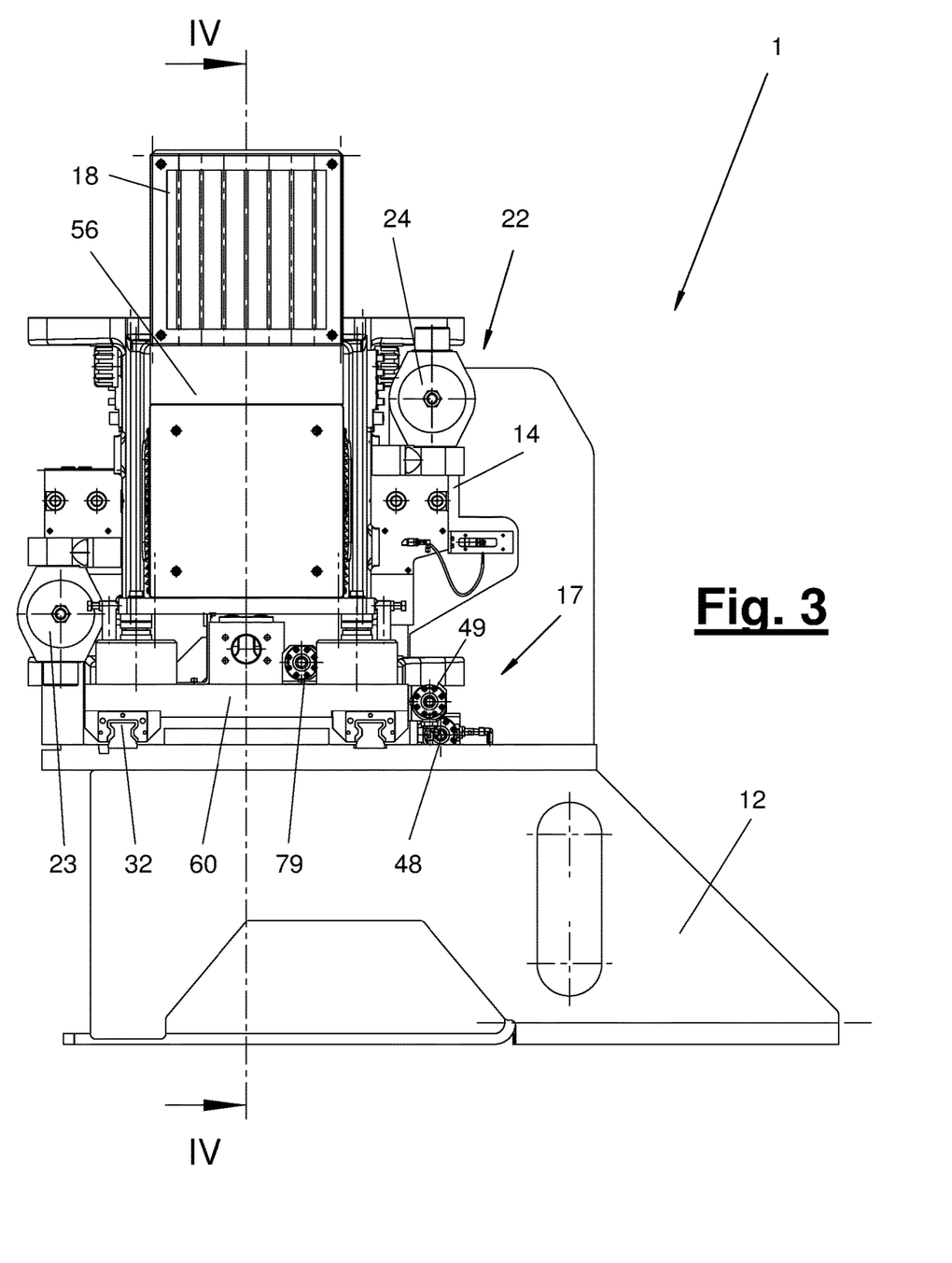
FIG. 3 is a front view of the pressure welding device according to arrow III from FIG. 2.

FIG. 3 shows one of the upsetting drives (22), of machine head (14) of the machine heads (13, 14). The upsetting drives (22) can be controlled and regulated together and possibly in a coordinated manner or, as an alternative, independently of one another. The pressure welding device (1) may have a detection device, especially sensors, for detecting the motions of the machine head and/or drives. In this case, e.g., path, speed and acceleration as well as possibly additional process-relevant parameters, e.g., forces, pressures or torques, can be detected. A contact or an axial distance may also be detected. The upsetting drives (22) and the detection device may be connected to the machine control in terms of signal and control.

FIGS. 1 through 5 show a first operation variant of the pressure welding device (1) as a double-head machine, in which two external components (2, 4) are preferably simultaneously welded at the ends of a central component (3). As a result, a three-part welded part (5) is formed. The machine heads (13, 14) located at the ends of the machine frame (12) are simultaneously moved towards one another for this. The central component (3) may extend through the upsetting or support head (27).

FIGS. 6 and 7 show a second operation variant of the pressure welding device (1) as a double single-head machine. In FIG. 6, end-side components (2, 4) are each welded to an associated component (3, 3'), wherein two two-part welded parts (5') are formed. FIG. 7 shows the variant, in which a pressure welding process is currently taking place only on one side of the machine and an end-side component (2) is welded at an associated component (3), wherein a two-part welded part (5') is formed.

The pressure welding device (1) may be configured as a uniform integral machine with two machine and process areas arranged on both sides of the upsetting or support head (27). It may, as an alternative, be configured as a combination machine and consist of two single-head machines, which are arranged in a mirror-inverted manner or centrosymmetrically, each with a single end-side machine head (13, 14) next to its own upsetting drive (22) and its own single frame. The single frames may be connected to a common machine frame (12). A preferably common stationary upsetting head (27) is arranged at the center or junction point of the single-head machines and supported at the machine frame (12). A plurality of upsetting heads may, as an alternative, be present.

The single-head machines or the machine and process areas of the integral machine may have a similar or a different configuration. They may be operated together or independently of one another. A compartment (87) indicated in FIG. 2 for separating the working areas may be arranged at the upsetting head (27) between the single-head machines or the machine and process areas on both sides. A parallel operation at the two single-head machines or machine and process areas is possible for the pressure welding device (1) as a result. In addition, a single operation using only one of the single-head machines can be carried out.

The single-head machines can be used for other intended uses as separate single machines. As a result, a modular system can be formed and higher piece counts can be achieved.

FIGS. 6 and 7 show the stationary upsetting head (27) has a fixed or detachable upsetting stop (28) on both sides for the components (3, 3') at the component mounts (36, 37). The upsetting stop may have a mount for an insertable upsetting rod. The upsetting stops (28) are intended for the operation of the pressure welding device (1) as a double single-head machine or for said parallel operation. The upsetting stops (28) can be removed or deactivated for operation as a double-head machine in order to create space for the central component (3). This can be carried out by modifying or replacing the upsetting head (27).

The modifiable upsetting or support head (27) has a frame-shaped or strap-shaped configuration in the pressure welding device (1) of FIGS. 1 through 7. It has a central passage (85) with an insert (86) arranged detachably therein with upsetting stops (28) on both sides. The arrangement and detachable fastening of the upsetting stops (28) may also be structurally configured in a different manner.

In case of operation as a double single-head machine according to FIGS. 6 and 7, the insert (86) is assembled with the upsetting stops (28). The insert (86) is removed and the central passage (85) is open for the central workpiece (3) for the operation as a double-head machine. The pressure welding device (1) can thus be operated in a multifunctional manner, as desired, as a double-head machine or a double single-head machine.

The welding processes at the single-head machines or the machine and process areas on both sides may run in a coordinated manner in terms of time and force. FIG. 6 shows this configuration. The upsetting forces on both sides can be neutralized at the upsetting head. Such a synchronous operation is possible in case of similar components (2, 3 and 4, 3').

In one variant, the two welding processes can run independently of one another. This may be a parallel operation with unlike components (2, 3, 4, 3'). Further, a welding operation may possibly run only on one side of the pressure welding device (1) or on one of the two single-head machines. FIG. 7 shows this variant.

Figure 2:
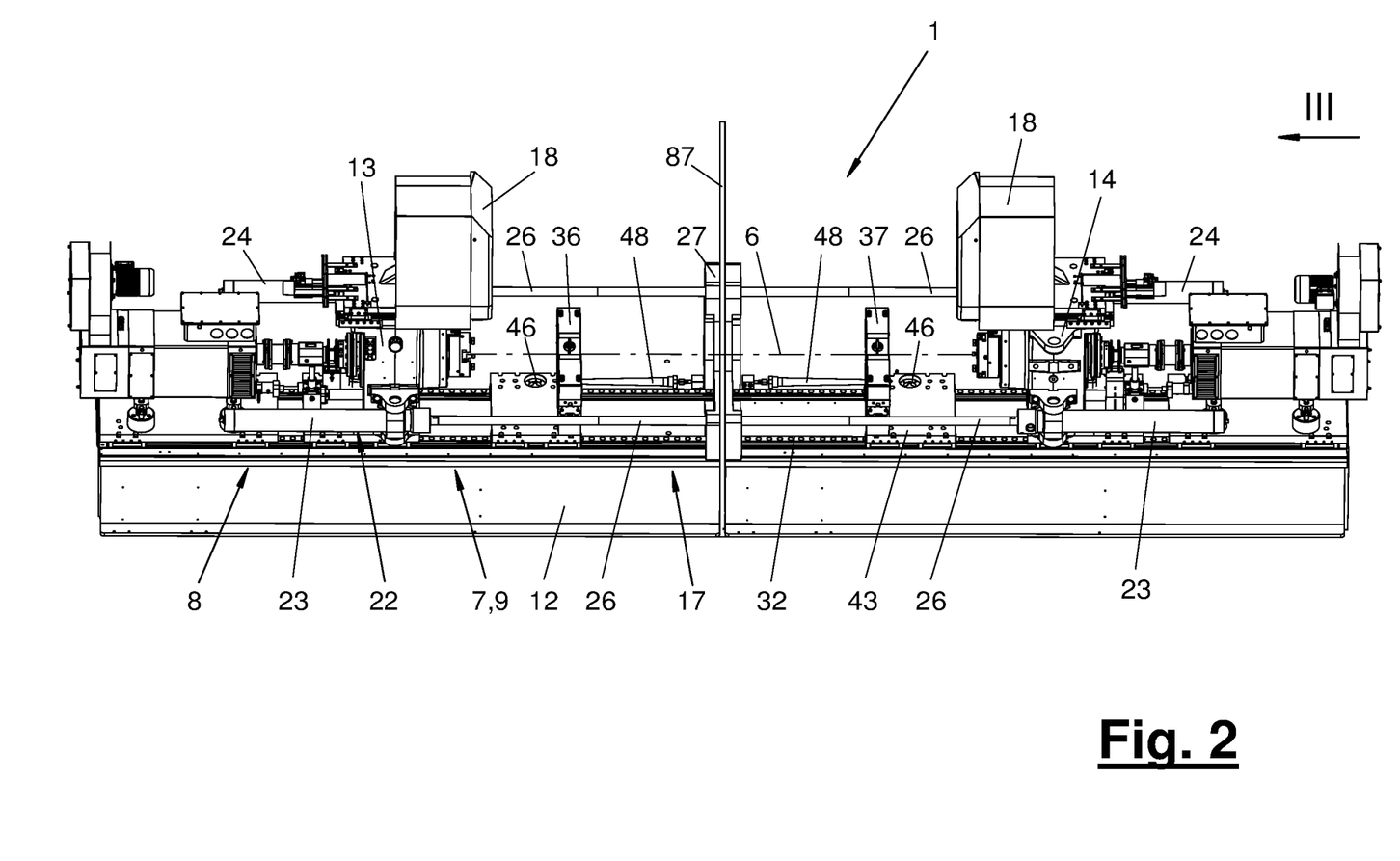
FIG. 2 is a side view of the pressure welding device from FIG. 1.

As shown in FIG. 2, the additional or central component mount (36, 37) may be fixed when needed on the machine bed (12), especially on the guide (32) by means of a controllable fixing device (46) by clamping or in another manner. The fixing device (46) has, e.g., an elastically prestressed clamping against the guide (32), which can be released hydraulically. It may form, e.g., an additional securing of the position, which prevents a migrating of the component mount (36, 37) when the machine is turned off (free from voltages and pressures). The fixing device (46) can be omitted, as an alternative.

In the first variant shown in FIGS. 1 through 5, two such central component mounts (36, 37) are arranged between the end-side machine heads (13, 14) and jointly receive a central and thus third component (3). In the second variant shown in FIGS. 6 and 7, an additional or central component mount (36, 37), which receives a single additional component (3, 3'), is always associated with each machine head (13, 14).

The component mounts (34, 35, 36, 37) may receive the respective component (2, 3, 3', 4) in any desired and suitable manner. Tas shown in FIG. 5, component mounts (34) and preferably component mounts (35, 36, 37) have for this each a remote-controllable clamping device (39) with adjustable clamping elements (40) and an actuating device (41). The clamping device (39) may be configured as a chuck, optionally with a one-step or multistep configuration, or as a self-centering chuck or in another manner.

The upsetting devices (8) act in the exemplary embodiments shown between the machine heads (13, 14) and the preferably central upsetting or support head (27). The upsetting device (8) now generates pulling forces in the direction of the machine axis (6). FIGS. 2 and 3 show that it has an upsetting drive (22), which is arranged between the machine head (13, 14) and the upsetting or support head (27) and is connected to both. The upsetting drive (22) acts by pulling and pulls the component (13, 14, 27) against one another.

The upsetting device (22) may have various configurations. In the exemplary embodiments shown, it has two or more parallel drive units (23, 24), which are aligned along the machine axis (6)—FIG. 2. The drive units (23, 24) are arranged on different sides of the machine axis (6), especially on both sides and are diametrically opposed to one another to the machine axis (6). The drive units are preferably configured as cylinders.

As an alternative, the drive units (23, 24) may be configured in another manner, e.g., as electrical rod or spindle drives. The arrangements and embodiments explained below in connection with the cylinders (23, 24) shown correspondingly also apply to other embodiments of drive units.

As shown in FIG. 3, the cylinders (23, 24) are arranged at different levels above the machine bed (12). The cylinder (23) located adjacent to the operating area or the operating side (20) is arranged in a low position and just barely above the top side of the machine bed (12).

The cylinders (23, 24) are preferably configured as hydraulic cylinders. They have an extensible piston rod (26) and a cylinder housing (25) each. The cylinder housings (25) are preferably mounted and supported at the machine head (13, 14). The free ends of the piston rods (26) are fastened at the support head (27). In other drive units, the drive housing (25) and the extensible drive element (26), e.g., a toothed rack or a threaded spindle, may be arranged and connected correspondingly.

Figure 5:
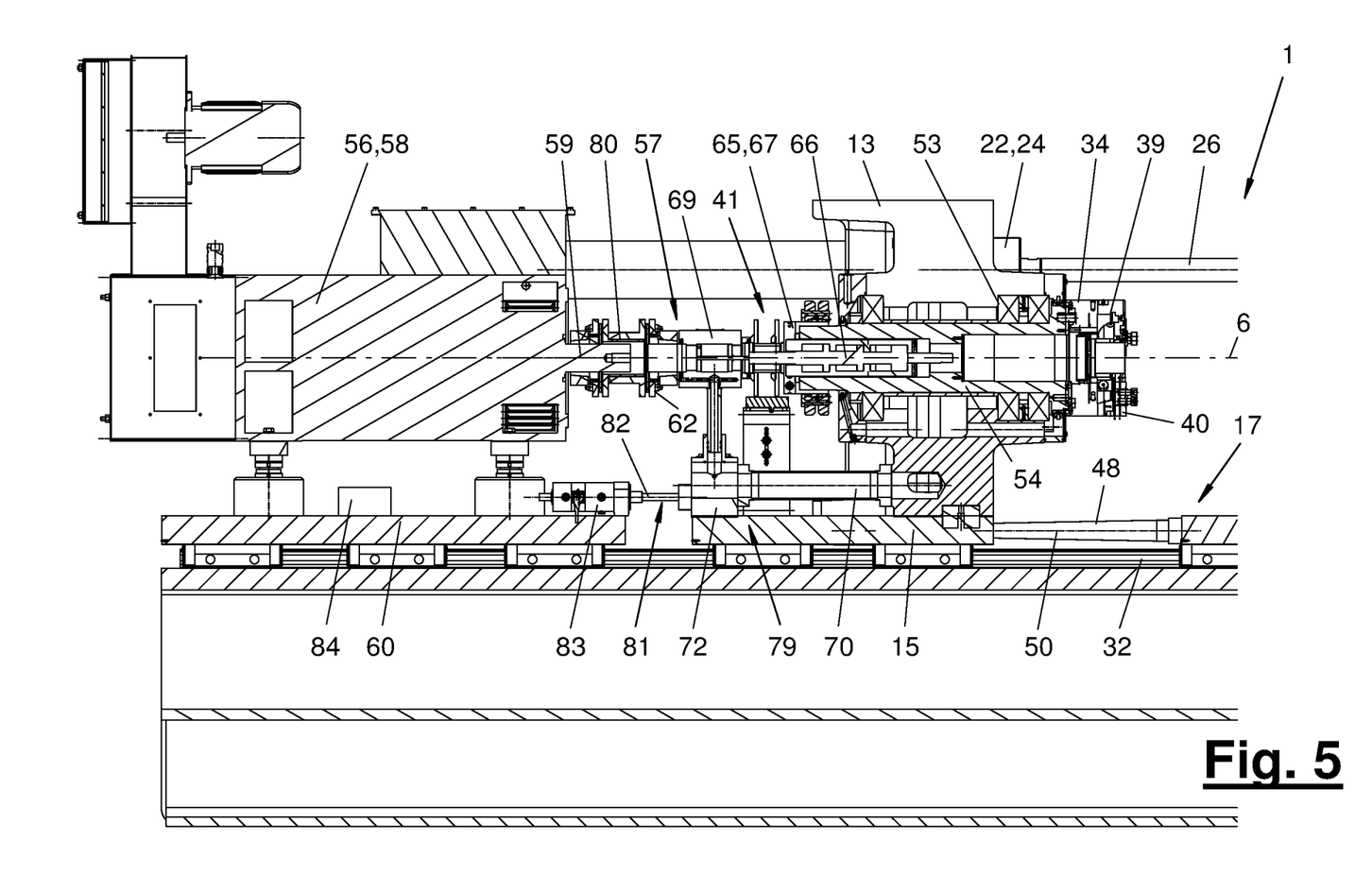
FIG. 5 is an enlarged view of the detail V from FIG. 4.

In the exemplary embodiments shown, the pressure welding device (1), especially the friction device (9) has at the machine head (13, 14) a rotatable shaft (54) each, which will hereinafter be called a spindle, a component mount (34, 35)

arranged on the front side at the spindle (54), a headstock and a spindle drive (56). FIG. 5 shows the configuration with the spindle (54). The headstock (53) contains the mount, guide and support of the spindle (54) and is arranged and supported at the machine head (13, 14). A drive train (57), which extends along the machine axis (6) and is preferably aligned with same, is located between the component mount (34, 35) and the spindle drive (56).

The machine head (13, 14) and the corresponding spindle drive (56) may be arranged separated from one another and be each mounted separately on the machine frame (12). They are arranged at a distance behind one another in the direction of the machine axis (6). A controllable mass decoupling device (79) may be arranged between the machine head (13, 14) and the corresponding spindle drive (56).

Such an arrangement may also be present in the above-mentioned variant of the plasticization device (7) with an arc device.

As shown in FIGS. 3, 4 and 5, the spindle drive (56) is configured as a direct drive in the embodiment being shown. It has a drive motor (58), whose motor shaft (59) is aligned essentially flush with the longitudinal axis of the spindle (54) and with the machine axis (6). The motor shaft (59) is coupled via a coupling (62) with the spindle (54) or with an actuating device (41) for the component mount (34), which actuating device will be explained below. The coupling (62) has a nonrotating and flexurally elastic configuration. It may possibly compensate alignment errors, especially lateral offset and/or oblique position. Further, a controllable brake (not shown) may be present in the drive train (57).

As an alternative, the drive motor may be arranged laterally offset from the spindle (54) as well as the machine axis (6) and drive the spindle (54) via an intermediate gear, especially a belt drive.

In another variant, the spindle drive (56) may have a disk flywheel arrangement (not shown). The disk flywheels are set into rotation about the machine axis (6) by the drive motor (58) and then bring about an inertia drive for the spindle (54), and a controllable brake can control or regulate the speed of rotation in the drive train (57) and possibly also stop the rotation. The disk flywheel arrangement can be separated from the drive motor (58) and optionally from the spindle (54) by means of a coupling.

The spindle drive (56) is arranged on a slide-like drive carrier (60) and is mounted axially displaceably at the machine frame (12) in the exemplary embodiments shown. It may now be mounted and guided on the same guide (32) as the corresponding machine head (13, 14). The spindle drive (56) may further have a controllable drive fixing device (84), with which it can be fixed to the machine bed (12) if necessary and temporarily. If a disk flywheel arrangement is present, this may likewise be arranged on the drive carrier (60).

In one variant, not shown, the spindle drive (56) can be arranged stationarily on the machine frame (12). A possible disk flywheel arrangement is also stationary in this case.

FIGS. 3 and 5 show the controllable mass decoupling device (79), which can couple the machine head (13, 14) moved by the upsetting drive (22) with the spindle drive (56) or decouple it from same as needed during its axial feed along the machine axis (6). The mass of the spindle drive (56) and of the drive carrier (60) thereof as well as optionally of the disk flywheel arrangement and additional components are carried along during the feed, especially feed stroke, in the coupled state. This carrying does not take place in the decoupled state. The coupling preferably takes place mechanically. The mass decoupling device (79) may have an axial-tolerant coupling (80) in the drive train (57). Further, it may have a detachable and controllable coupling device (81) between the spindle drive (56) and the machine head (13, 14), especially between the carriers (15, 16, 60) thereof. The mass decoupling device (79) can be controlled via said machine control.

As can be seen in FIG. 1, the pressure welding device (1) has the actuating device (41) mentioned for the component mount (34) at the machine head (13). It preferably acts on the clamping element or clamping elements (40). The actuating device (41) has an actuating drive (65), which is arranged between the spindle drive (56) and the spindle (54) in the drive train (57). The actuating drive (65) is preferably arranged co-rotatingly in the drive train (57). FIGS. 4 and 5 illustrate this arrangement. The spindle drive (56), especially the drive motor (58), may be aligned here flush with the machine and spindle axis (6), which offers advantages in terms of the free selection of the motor and the economy resulting therefrom.

The actuating device (41) has an actuating drive (65) with an actuating element (66), which is shown in FIG. 5, is passed through the interior space of the hollow spindle (54) and acts on the adjusting element of the clamping elements (40), e.g., by an axial motion. The actuating drive (65), which is, e.g., a hydraulic or electric drive, has a jacket-shaped drive housing (67), which is connecting nonrotatingly to the motor shaft (59), on the one hand, and to the jacket of the hollow spindle (54), on the other hand, and transmits the drive torque of the spindle drive (65) in a deformation- and loss-free manner.

The actuating device (41) further has a rotary feed device (69) for operating materials, e.g., hydraulic fluid or electric current, from the outside to the actuating drive (65) rotating with the spindle (54). A port is arranged for this for a flexible tube or a cable, not shown, on a stationary feed housing of the rotary feed device (69). Further, external lines (70) for removing overflow oil as well as a connection head (72), which may have a support function at the same time for the rotary feed device (69), are provided. Internal lines may be laid in the interior space or in the jacket of the spindle (54) to the output elements (66), e.g., a piston arrangement, optionally arranged in the spindle (54).

The actuating device (41) has a lightweight and compact design. It is arranged on a carrier (15, 16) of the corresponding machine head (13, 14) and is moved together with this.

A measuring device (not shown) with a measuring shaft for detecting the drive torque and optionally the drive speed may be arranged in the drive train (57) between the spindle drive (56) and the spindle (54). The measuring device may be inserted between the motor shaft (59) and the spindle (54) or the actuating device (41). The drive or motor shaft (59) may have a split configuration, the measuring shaft being inserted between the shaft halves. As an alternative, the drive or motor shaft (59) may be provided with suitable measuring elements and form the measuring shaft (76).

The pressure welding device (1) may have, according to FIG. 1, a machining device (18) associated with the machine head (13, 14) and/or with the additional component mount (36, 37) for machining the welded part (5, 5') after the welding process. The machining device (18) may optionally also be used for machining one or more yet to be connected components (2, 3, 3', 4). The machining device (18) is configured, e.g., as a cutting device, especially as a turn-off device or as a punch for the weld bead. It may also be used in the variant of FIGS. 6 and 7.

As shown in FIGS. 3-7, the pressure welding device (1) further has an adjusting device (17), with which a relative motion is generated between the machine head (13, 14) and the associated additional component mount (36, 37). This relative motion and the change in distance associated with it between the machine head (13, 14) and the component mount (36, 37) may be used for machining the welded part (5, 5') or optionally a component (2, 3, 3', 4). A plurality of adjusting devices (17) may be present.

The adjusting device (17) may have various configurations and arrangements. Two adjusting devices (17) are present in the variants shown in FIGS. 1 and 6, one adjusting device (17) each being associated with the central component mounts (36, 37). The simple single-head machine has only one adjusting device (17).

The adjusting device (17) may act in different manners. On the one hand, it may bring about the above-described relative motion and distance change for the machining. On the other hand, it may be used for a length adjustment for different components (21, 3, 3', 4) with different component lengths. It may bring about a compensation of insertion errors, component tolerances or even component elasticities in the welding process.

The adjusting device (17) has a controllable and variable-length coupling device (48, 49). A plurality of these devices may be present.

A coupling device (48) is located between the central component mount (36, 37) and the upsetting or support head (27) in the variants shown in FIGS. 1 and 6. It brings about the relative motion and distance change for the machining. It drives the component mount (36, 37) and moves same relative to the upsetting or support head (27), on which it is supported, on the other hand, secured on the frame.

Further, a coupling device (48) is arranged between the machine head (13, 14) and the associated additional component mount (36, 37). It drives and moves the component mount (36, 37), and it is supported at the support head (27). This coupling device (48) is used to compensate insertion errors, component tolerances or even component elasticities during the welding process.

The coupling devices (48, 49) may have identical configuration. They ensure the connection of the components (13, 14, 27, 36, 37) in the direction of the machine axis (6) and are preferably connected to the respective carriers (15, 16, 42, 43) thereof.

In the schematically shown variant of FIG. 8, the pressure welding device (1) has a plurality of, e.g., two, three or more, central component mounts (88), which together radially and axially fix the component (3) as well as absorb the upsetting pressure. The component mounts (88) can be arranged and supported stationarily on the machine frame (12). They may replace the upsetting stop (28), the machine head (13, 14) being arranged axially displaceably on the machine frame (12). The support head (27) may have the passage (85) mentioned for a very long component (3). A single-head machine having this configuration has an extended range of application and may also be used for extra-long components (3). A use of such component mounts (88) is also possible in case of a double-head machine.

Various variants of the exemplary embodiments shown and described are possible. In particular, the features of the different exemplary embodiments may be combined with and also replaced by one another as desired. The upsetting drive (22) may have a conventional configuration, e.g., according to the state of the art mentioned in the introduction. The adjusting device (17) may have only one coupling device (48, 49) for the relative motion mentioned for the machining or a transposed arrangement of coupling devices (48, 49). An individual coupling device may, in addition, assume all the adjusting functions mentioned in case of a corresponding configuration.

While specific embodiments of the invention have been shown and described in detail to illustrate the application of the principles of the invention, it will be understood that the invention may be embodied otherwise without departing from such principles.

The invention claimed is:

1. A pressure welding device with a plasticization device and with an upsetting device, the pressure welding device further comprising:
   a machine frame;
   a guide disposed on the machine frame and extending along at least a portion of the machine frame;
   a plurality of machine heads, each of the machine heads having a component mount and each of the machine heads being mounted displaceably on the machine frame for displacement along the machine frame;
   an upsetting drive connected to each of the machine heads, wherein each of the machine heads and each associated upsetting drive is controlled independently of the other of the machine heads and the associated upsetting drives, for independently applying an upsetting force with each of the connected machine heads;
   a plurality of carriers, each of the carriers comprising a slide mounted displaceably on the guide for displacement relative to the machine frame along the guide;
   an upsetting head or support head secured on the frame and arranged between the machine heads;
   a plurality of additional component mounts, wherein each one of the plurality of additional component mounts is carried by a respective one of the carriers whereby each of the additional component mounts is mounted displaceably on the machine frame between the upsetting head or support head and a respective machine head, wherein:
   the upsetting or support head has a frame configuration defining a central passage;
   the upsetting or support head further comprises an insert detachably arranged on the frame configuration and comprising upsetting stops mounted on respective sides of the insert, whereby the upsetting head or support head has an upsetting stop on respective sides or the upsetting head or support head has the central passage as an open passage for support of a central component extending through the central passage when the insert is detached from the frame configuration, and the upsetting head or support head is modifiable to change between the upsetting stops on respective sides for operation with the upsetting stops as a double single-head machine and the open passage for the support of the central component for operation as a double-head machine.

2. A pressure welding device in accordance with claim 1, further comprising a plurality of stationary component mounts arranged stationarily on the machine frame between the machine head and the support head.

3. A pressure welding device in accordance with claim 1, wherein the respective upsetting drive is arranged between the end-side machine head and the central upsetting or support head.

4. A pressure welding device in accordance with claim 1, wherein the upsetting drives are connected to the upsetting or support head and connected to the respective machine head and act by pulling and each of the upsetting drives comprises two or more parallel drive units arranged along and on respective sides next to a machine axis of the machine heads.

5. A pressure welding device in accordance with claim 1, further comprising:
a spindle drive; and
a controllable mass decoupling device, wherein:
the machine head and the spindle drive are arranged separated from one another on the machine fram;
the controllable mass decoupling device is arranged on the machine frame between the spindle drive and the machine head.

6. A pressure welding device in accordance with claim 1, further comprising an adjusting device for adapting to different component dimensions, including component lengths.

7. A pressure welding device in accordance with claim 1, further comprising:
a spindle drive;
a spindle; and
an actuating device, arranged in a drive train between the spindle drive and the spindle, the actuating device comprising an actuating drive for driving the component mount.

8. A pressure welding device in accordance with claim 1, wherein each machine head has a spindle and a spindle drive and the spindle drive has a drive motor arranged essentially aligned with a machine axis and a spindle axis.

9. A pressure welding device in accordance with claim 1, wherein:
the pressure welding device is configured as a friction welding device, wherein the plasticization device has a friction device; or
the pressure welding device is configured as a welding device with a magnetically moved arc, wherein the plasticization device has an arc device.

10. A pressure welding device in accordance with claim 1, wherein each of the machine heads is carried by a respective one of the carriers to provide the displaceable mounting of the respective machine head on the machine frame for displacement of the respective machine head along the machine frame.

11. A method for pressure welding components with a pressure welding device, which has a plasticization device and an upsetting device as well as component mounts for the components to be welded together and a machine frame, as well as a plurality of machine heads each with a component mount, the method comprising:
arranging the plurality of machine heads movably on the machine frame with each connected to a respective upsetting drive, wherein each of the machine heads and the respective upsetting drives is controlled independently of the other of the machine heads and the associated upsetting drives, for applying an upsetting force with each of the connected machine heads independently of an applying of an upsetting force with each other of the other connected machine heads;
arranging an upsetting head or support head, secured on the frame, between the machine heads;
providing the upsetting head or support head with a frame configuration defining a central passage and with an insert detachably arranged on the frame configuration to form an upsetting stop on each of respective sides of the the upsetting head or support head or upon detaching the insert from the frame configuration, providing the upsetting head or support head with an open passage for support of a central component thereby providing the upsetting head or support head as modifiable to change between the upsetting stop on each of the respective sides or the open passage for the support of the central component;
providing a guide on the machine frame;
providing additional component mounts, mounted movably on the machine frame, each of the additional component mounts being positioned between the upsetting head or support head and one of the machine heads; and
providing a plurality of carriers with each of the carriers comprising a slide mounted displaceably along the guide and with each additional component mount being carried by one of the carriers;
operating the pressure welding device with the upsetting stops as a double single-head machine; and
operating the pressure welding device with the open passage, for the support of a central component, as a double-head machine.

12. A method in accordance with claim 11, wherein a single operation or a parallel operation of pressure welding processes is selectively carried out.

13. A method in accordance with claim 11, wherein a single pressure welding process for a single welded part or a plurality of separate pressure welding processes are carried out parallel and simultaneously or offset in time for forming two or more welded parts.

14. A method in accordance with claim 11, wherein a plurality of central component mounts are provided, each of the plurality of central component mounts jointly fixing the component radially and axially as well as absorbing upsetting pressure.

15. A method in accordance with claim 11, wherein a plurality of stationary component mounts are arranged and supported stationarily on the machine frame.

16. A method in accordance with claim 11, wherein the components are plasticized by friction or by a rotatingly moved arc on their front edges facing each other.

17. A method in accordance with claim 11, wherein each of the machine heads is carried by a respective one of the carriers to provide the displaceable mounting of the respective machine head on the machine frame for displacement of the respective machine head along the machine frame.

* * * * *

UNITED STATES PATENT AND TRADEMARK OFFICE
CERTIFICATE OF CORRECTION

Page 1 of 1

PATENT NO. : 10,543,550 B2
APPLICATION NO. : 15/526145
DATED : January 28, 2020
INVENTOR(S) : Michael Büchler et al.

It is certified that error appears in the above-identified patent and that said Letters Patent is hereby corrected as shown below:

On the Title Page

(73) Assignee Should read:
KUKA INDUSTRIES GMBH

Signed and Sealed this
Tenth Day of May, 2022

Katherine Kelly Vidal
*Director of the United States Patent and Trademark Office*